April 1, 1952 — L. F. BARTOW — 2,591,040
PNEUMATIC LIFT CONDUIT AND DISENGAGER VESSEL
Filed Dec. 27, 1950
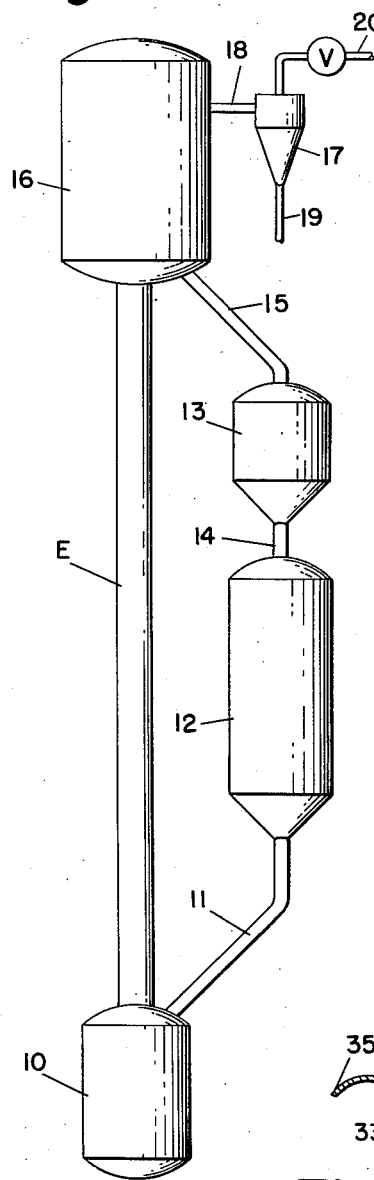
Fig. 1
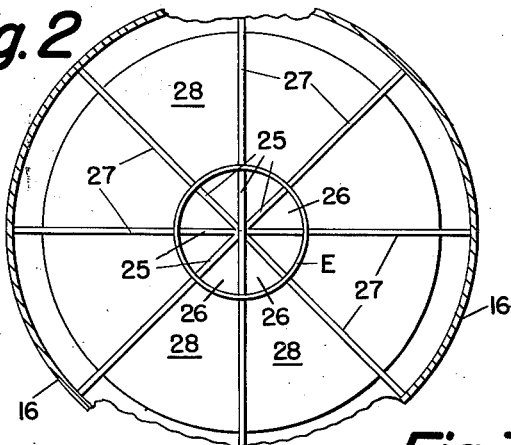
Fig. 2
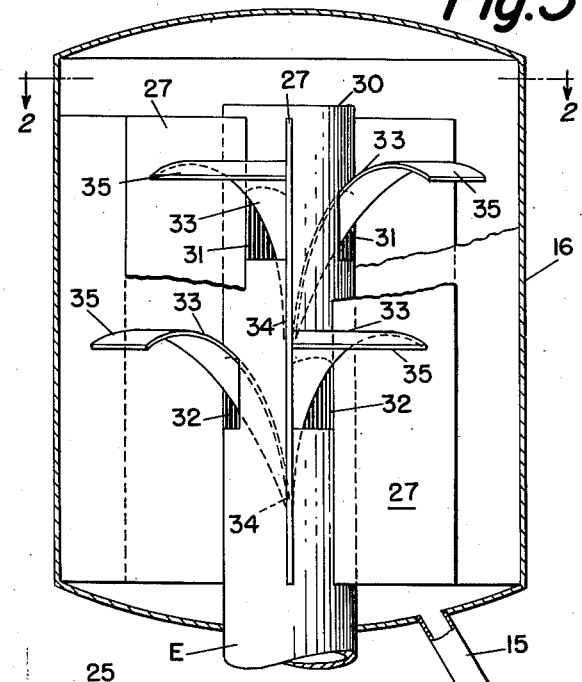
Fig. 3
Fig. 4
INVENTOR.
LEWIS F. BARTOW
BY Busser and Harding
ATTORNEYS Patented Apr. 1, 1952

2,591,040

UNITED STATES PATENT OFFICE 2,591,040

PNEUMATIC LIFT CONDUIT AND DISENGAGER VESSEL

Lewis F. Bartow, Toledo, Ohio, assignor to Sun Oil Company, Philadelphia, Pa., a corporation of New Jersey Application December 27, 1950, Serial No. 202,954

4 Claims. (Cl. 302—17)

This invention relates to a system and apparatus for moving pneumatically granular or pelleted contact material or catalyst from a lower vessel, which receives the material in a continuous stream, upwardly into an upper vessel. In particular the invention is directed to apparatus for elevating by gas, air or other fluid lifting medium contact material from the lower vessel through an elevating conduit to an upper vessel in such a manner as to reduce attrition of the material particles or pellets to a minimum during passage to the upper vessel.

It is well known in the art of catalytic operations, such as the cracking of heavier petroleum fractions to gasoline and other hydrocarbon processing operations to use granular or pelleted catalytic or contact material in a continuous system. In such systems a conversion zone is operated continuously to produce the desired product while a second zone operates continuously in regeneration. Most commercial moving catalyst systems have the conversion zone and regeneration zone in superposed relationship with the conversion zone usually above the regeneration zone so that the catalyst or contact material moves through the conversion zone to the regeneration zone by gravity and after regeneration it is carried upwardly and returned to the conversion zone to repeat the cycle of operation. To return the catalyst or contact material from the lower regeneration zone to the upper conversion zone two well known means applicable to the transportation of granular solids from one locus to another have been used namely: by mechanical conveyers and by pneumatic conveyers, in the latter of which air, steam or flue gas produced at the refinery is readily available as the pneumatic lifting medium.

It is necessary in systems employing conversion and regeneration zones in superposed relationship to convey the catalyst or contact material which is in pelleted or granular form continuously upwardly to a height of several hundred feet, in order that it can be delivered continuously by gravity to the conversion and regeneration zones to maintain them in operation. Conveying the material upwardly by a fluid medium requires a vessel positioned at a level below that of the lower reaction zone which is designed to initiate the lifting or upward conveying operation. This lowermost vessel is generally known in the art as an engager since the material is engaged therein by the lifting fluid to effect the lifting operation. An elevating or lift conduit has its lower end extending into or is in communication with the engager vessel while its upper end communicates with an upper vessel positioned at a level above the level of the upper end of the upper reaction zone or chamber. The upper vessel is designed so that the lifting medium is separated from the catalyst or contact material and is generally known as the disengager.

Specifically the present invention is directed to the elevating conduit and the disengager portion of the elevating system which are arranged to lift the contact material upwardly and into the disengager with a minimum of attrition.

Figure 1 is a diagrammatic view of a system for utilizing a moving mass of contact material.

Figure 2 is a horizontal sectional view through the disengager vessel.

Figure 3 is a vertical sectional view to show details of the disengager vessel of the system.

Figure 4 is a detail of Figure 3.

Referring to Figure 1, the engager is indicated at 10 and receives the catalyst or contact material by gravity continuously through line 11 from the regeneration zone 12 positioned below the upper conversion zone 13 which is in communication with zone 12 through line 14. The conversion zone 13 receives the material by gravity continuously by line 15 from the disengager 16. Means for elevating the contact material from the engager 10 to the disengager 16 is shown generally at E. Separating means such as a cyclone separator 17 is in communication with the disengager 16 through line 18 and fines are removed from the separator through line 19 while the lifting medium is removed from the separator through line 20.

Referring to Fig. 2 the elevating conduit E is shown positioned within the disengager 16 and the conduit E is provided with a plurality of partitions 25 which extend the full length of the conduit providing independent compartments 26 through which the contact material is elevated from the engager 10 to the disengager 16. The disengager 16 is also provided with partitions 27 forming compartments 28 therein. The partitions 27 are aligned with the partitions 25 so that each compartment 26 of the conduit E will be complemental to a compartment 28 of the disengager 16. The partitions 25 and 27 may be secured to conduit E and the disengager 16 respectively in any desired manner as, for example, by welding. Any desired number of compartments 26 may be provided within the scope of this feature of the invention which is to provide an arrangement for elevating the contact material through small passageways in order to reduce to a minimum turbulence and swirling action of the material and thus reduce attrition of the material.

Referring to Figure 3, the upper end portion 30 of conduit E extends a substantial distance upwardly into the disengager 16 and is provided with sets of openings or windows which are spaced longitudinally of the upper portion 30 of conduit E and a window is provided for each compartment of the conduit. The windows 31 of the upper set are positioned circumferentially in one-half of the compartments while the lower set of windows 32 are positioned circumferentially of the conduit in the other half of the compartments. In the figure the windows of each set are aligned circumferentially of the conduit E but, of course, the windows could be positioned in staggered relation in carrying out the invention. A deflector 33 is provided for each window. Each deflector 33 terminates in an inner tapered end portion 34 which as shown in Figure 4 are secured to the partitions 25 forming the conduit compartments. The deflectors extend through the windows 31 and 32 and have their outer end portions 35 positioned within the compartments 28 of the disengager. It is also within the scope of the invention to eliminate the disengager partitions.

The deflectors are constructed in a bowed shape and taper from their outer ends to their inner ends in a generally similar shape of the compartments 26 and 28. It will be seen then that as a body of material advances into the disengager 16, it will be interrupted by the deflectors and directed outwardly from the compartments 26 of conduit E and then downwardly in streams into the disengager 16 or into the disengager compartments 28. From the disengager 16 the material will pass by gravity through line 15 and through other vessels of the system as explained in connection with Figure 1.

I claim:

1. In apparatus for moving granular material from a lower vessel to an upper vessel through an elevating conduit having its upper end portion positioned within the upper vessel, the improvement which comprises a plurality of partitions extending longitudinally of the conduit providing a plurality of compartments therewithin, openings in the upper end portion of the conduit within the upper vessel providing a window for each conduit compartment, a deflector extending through the window of each compartment each having its inner end secured within the conduit and its outer end positioned within the upper vessel, said deflectors being adapted to interrupt the flow of the material in the conduit and deflect it outwardly in streams into the upper vessel.

2. In apparatus for moving granular material from a lower vessel to an upper vessel through an elevating conduit having its upper end portion positioned within the upper vessel, the improvement which comprises a plurality of partitions extending longitudinally of the conduit providing a plurality of compartments therewithin, a plurality of partitions extending longitudinally of the upper vessel providing a plurality of compartments in the upper vessel which are complemental to the conduit compartments, openings in the upper end portion of the conduit within the upper vessel providing a window for each conduit compartment, a deflector extending through the window of each compartment each having its inner end secured within the conduit and its outer end positioned within the upper vessel, said deflectors being adapted to interrupt the flow of the material in the conduit and deflect it outwardly in streams into the upper vessel.

3. In apparatus for moving granular material from a lower vessel to an upper vessel through an elevating conduit having its upper end portion positioned within the upper vessel, the improvement which comprises a plurality of longitudinal partitions extending radially inwardly from the inner conduit wall providing a plurality of compartments, a plurality of longitudinal partitions each aligned with a partition of the conduit and extending from the inner wall of the upper vessel toward the conduit providing a plurality of compartments in the upper vessel each of which is complemental to a compartment of the conduit, openings in the upper end portion of the conduit providing a window for each conduit compartment, a deflector extending through the window of each compartment each having its inner end secured within the conduit and its outer end positioned within the upper vessel, said deflectors being adapted to interrupt the flow of material in the conduit and being bowed with their outer ends bent downwardly in order to deflect the contact material in streams outwardly and downwardly into the upper vessel.

4. In apparatus for moving granular material from a lower vessel to an upper vessel through an elevating conduit having its upper end portion positioned within the upper vessel, the improvement which comprises a plurality of longitudinal partitions radiating outwardly from the axis of the conduit to its inner wall providing a plurality of compartments, a plurality of longitudinal partitions each aligned with a partition of the conduit and extending from the inner wall of the upper vessel to the outer wall of the conduit, and providing a complemental compartment therein for each of the conduit compartments, an upper set of openings in one-half the conduit compartments, and a lower set of openings in the remaining half of the conduit compartments providing a window for each of the conduit compartments, a deflector extending through the window of each compartment each having its inner end secured below the window and within the conduit and its outer end positioned within the upper vessel, said deflectors adapted to interrupt the flow of the material in the conduit and being bowed and having their outer ends bent downwardly to deflect the material outwardly and downwardly in streams into the upper vessel.

LEWIS F. BARTOW.

No references cited.